(12) United States Patent
Yerdon

(10) Patent No.: US 8,632,088 B2
(45) Date of Patent: Jan. 21, 2014

(54) MOBILE ERGONOMIC EXERCISE TRICYCLE APPARATUS AND METHOD

(76) Inventor: Kevin J. Yerdon, Oneonta, NY (US)

( * ) Notice: Subject to any disclaimer, the term of this patent is extended or adjusted under 35 U.S.C. 154(b) by 0 days.

(21) Appl. No.: 13/611,294

(22) Filed: Sep. 12, 2012

(65) Prior Publication Data

US 2013/0001917 A1 Jan. 3, 2013

(51) Int. Cl.
*B62K 17/00* (2006.01)
(52) U.S. Cl.
USPC .......................................................... 280/221
(58) Field of Classification Search
USPC ............................. 280/221, 222, 228; 482/61
See application file for complete search history.

(56) References Cited

U.S. PATENT DOCUMENTS

| | | | |
|---|---|---|---|
| 295,154 A | 3/1884 | Dilatush | |
| 381,763 A | 4/1888 | Thresher | |
| 679,561 A | 7/1901 | Hircock | |
| 692,036 A | 1/1902 | Sawyer | |
| 1,404,274 A | 1/1922 | Cooper | |
| 2,194,161 A * | 3/1940 | Cobb | 280/287 |
| 3,561,778 A | 2/1971 | La Brie | |
| 3,836,177 A | 9/1974 | Heidt | |
| 4,277,078 A | 7/1981 | Root | |
| 4,360,224 A | 11/1982 | Sato et al. | |
| 4,469,344 A | 9/1984 | Coil | |
| 4,634,137 A | 1/1987 | Cocksedge | |
| 4,740,004 A | 4/1988 | McMullen | |
| 4,863,183 A | 9/1989 | Hwang et al. | |
| 4,917,396 A | 4/1990 | Meneses et al. | |
| 5,762,351 A | 6/1998 | SooHoo | |
| 6,367,824 B1 | 4/2002 | Hayashi | |
| 6,764,089 B2 | 7/2004 | Drymalski | |
| 6,817,617 B2 | 11/2004 | Hayashi | |
| 6,953,203 B2 | 10/2005 | Wilcox et al. | |
| 7,073,806 B2 | 7/2006 | Bagnoli | |
| 7,484,739 B2 | 2/2009 | Nash | |
| 7,543,829 B1 | 6/2009 | Barnes | |
| 7,708,291 B1 | 5/2010 | Henderson | |
| 7,731,213 B2 | 6/2010 | Saville | |
| 7,909,340 B2 | 3/2011 | Henderson | |
| 8,016,302 B1 | 9/2011 | Reeve | |
| 2004/0140645 A1 | 7/2004 | Hayashi | |
| 2007/0085298 A1 | 4/2007 | Balajadia | |

OTHER PUBLICATIONS http://www.treehugger.com/files/2010/01/streetstrider-cross-country-skiing-on-stand-up-trike-video.php, printed Aug. 28, 2012.
http://www.bicycleman.com/recumbents/trikes/recumbent-trikes.htm, printed Aug. 28, 2012.

(Continued)

*Primary Examiner* — Tony Winner
(74) *Attorney, Agent, or Firm* — Jay R. Yablon

(57) ABSTRACT

A mobile ergonomic exercise tricycle apparatus and related method of use, comprising: two front wheels; one rear wheel; two front handles, one for each hand of a rider; two pedals, one for each foot of the rider; and a connection between the pedals and the rear wheel such that actuation of the pedals by the rider's feet rotates the rear wheel to move the tricycle forward; wherein: the tricycle does not comprise any seat for sitting; and the pedals are positioned relative to the front handles such that when the rider's feet are atop the pedals and the rider's hands are touching the front handles, the rider is forced into a substantially upright, standing position when the apparatus is at rest and in motion.

11 Claims, 3 Drawing Sheets

(56) References Cited

OTHER PUBLICATIONS http://www.monarkexercise.se/default.asp?PageID=731, printed Aug. 28, 2012.

Terra-Trike Locking Brake Lever Set, http://shop.terratrike.com/Locking-Brake-Lever-Set-p/t1600178.htm.

Alibaba.com locking bicycle brake lever, http://www.alibaba.com/product-gs/599457707/locking_bicycle_brake_lever.html.

* cited by examiner

MOBILE ERGONOMIC EXERCISE TRICYCLE APPARATUS AND METHOD

BACKGROUND OF THE INVENTION

Due to lack of exercise and other poor health practices, the musculo-skeletal systems of many adults in the US are degenerating on a premature basis. This degeneration includes disc injuries, such as bulging, herniations and degenerations. Much of this is due to the compression that is caused by excessive sitting and reduced joint mobility. Not surprisingly, the demographic that suffers most from premature degeneration is the group aged 50 and over. Part of this premature degeneration complex includes a loss of stability and balance.

Bicycles and tricycles have been around for well over a century. While there are a wide variety of tricycle velocipedes in class 280 of the US patent classification, there are a much smaller number of human-powered, non-motorized tricycles in which the two wheels are in the front rather than the rear, which are included in an information disclosure being filed with this application. However, as among the limited number of non-motorized tricycles with two wheels in front, there do not appear to be any which are seatless, and which, by design, force the rider into a substantially upright, standing position when said apparatus is at rest and in motion. Such an upright posture is highly beneficial, both chiropractically and ergonomically.

One tricycle of interest included in the information disclosure is reviewed at http://www.treehugger.com/files/2010/01/streetstrider-cross-country-skiing-on-stand-up-trike-video.php. This, however, is an elliptical machine in which the user leans to steer the tricycle, and in which the handles for each hand are separate, relatively moving handles. What is needed, in contrast, is an ergonomically designed tricycle with traditional steering design and unitary, integrated handlebar that acts, in essence, to provide a more stable extension of the bicycle/tricycle experience which is not steered by leaning but rather by simply turning the handlebars and thus the front wheels.

Thus, it is desirable to provide a mobile exercise tricycle which provides a concentrated cycling workout that accentuates leg and core strength without the crutch of being able to sit down, and which forces the rider to maintain an upright posture throughout the cycling exercise. This would enable a healthy, ergonomic workout to occur in a relatively short period of time, without compression of the spine.

It is further desirable to provide a workout similar to that of a stationary exercise machine, but with a mobile device that allows outdoor exercise at the same time as it provides the enjoyment and varied scenic views of a mobile cycle ride.

It is further desirable to provide a wide front wheel base to ensure a high level of stability for the unstable rider, to provide a safe riding and workout experience.

It is further desirable to provide a velocipede device which does not require a running start in order for the user to mount the device, and/or which does not require the user to dismount the device while it is still in motion, with the falling and other dangers that entails especially for less-athletic users. This would enable safer mounting and dismounting for riders who may not be able to physically manage the running starts and moving stops of a bicycle.

It is further desirable to provide a velocipede with suitable shock absorption to provide a smoother ride, thereby reducing the adverse effects that the shock of a bumpier ride would have on the rider's spinal column.

It is further desirable to provide an exercise tricycle which readily compacts for transport and storage.

SUMMARY OF THE INVENTION

Disclosed herein is a mobile ergonomic exercise tricycle apparatus and related method of use, comprising: two front wheels; one rear wheel; two front handles, one for each hand of a rider; two pedals, one for each foot of the rider; and a connection between the pedals and the rear wheel such that actuation of the pedals by the rider's feet rotates the rear wheel to move the tricycle forward; wherein: the tricycle does not comprise any seat for sitting; and the pedals are positioned relative to the front handles such that when the rider's feet are atop the pedals and the rider's hands are touching the front handles, the rider is forced into a substantially upright, standing position when the apparatus is at rest and in motion.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

DETAILED DESCRIPTION

A standard tricycle design with two wheels in the rear has too much of the weight resting on the single front tire. This same front tire is forced to handle the cornering forces resulting in tipping or turnovers away from or outside the turn. By switching the design to provide two wheels in the front and one in the rear, the ergonomic exercise tricycle (trike) to be disclosed herein provides a high level of stability and handling capability.

In particular, this ergonomic exercise tricycle is designed such that when a rider has mounted the tricycle, the overall weight is substantially-equally distributed on each of the three wheels, with about ⅓ of the weight on each, providing a highly stable center of gravity. In all embodiments, no more than 40% of the weight, when the trike 1 is at rest, comes to be supported by any one wheel.

This ergonomic exercise tricycle provides additional stability through a locking rear brake (preferably a disc break, though not required), so that a user can lock the brake and mount the trike while the trike is still completely at rest, put their feet on the pedals, release the brake, and go.

Unlike a standard two-wheeled bike, this ergonomic exercise tricycle allows the rider to stop the trike 1 to a complete rest position while maintaining their position on the trike, with no need to remove their feet from the pedals. That is, the rider can stay mounted atop the trike 1 even when the trike 1 is not moving at all (stationary). After any such pause, the rider can continue cycling without dismounting by simply unlocking the brake and starting to pedal again. This may be iteratively repeated as often as desired by the user. This is beneficial for riders who may not have the physical acumen to mount and dismount a regular bicycle with the required running starts and jumping off while the bicycle has some forward momentum, yet would still like to be able to safely exercise on a moving cycle with the enjoyment that comes from riding outdoors, rather than a stationary exercise cycling machine which is often situated indoors.

Figure 2:
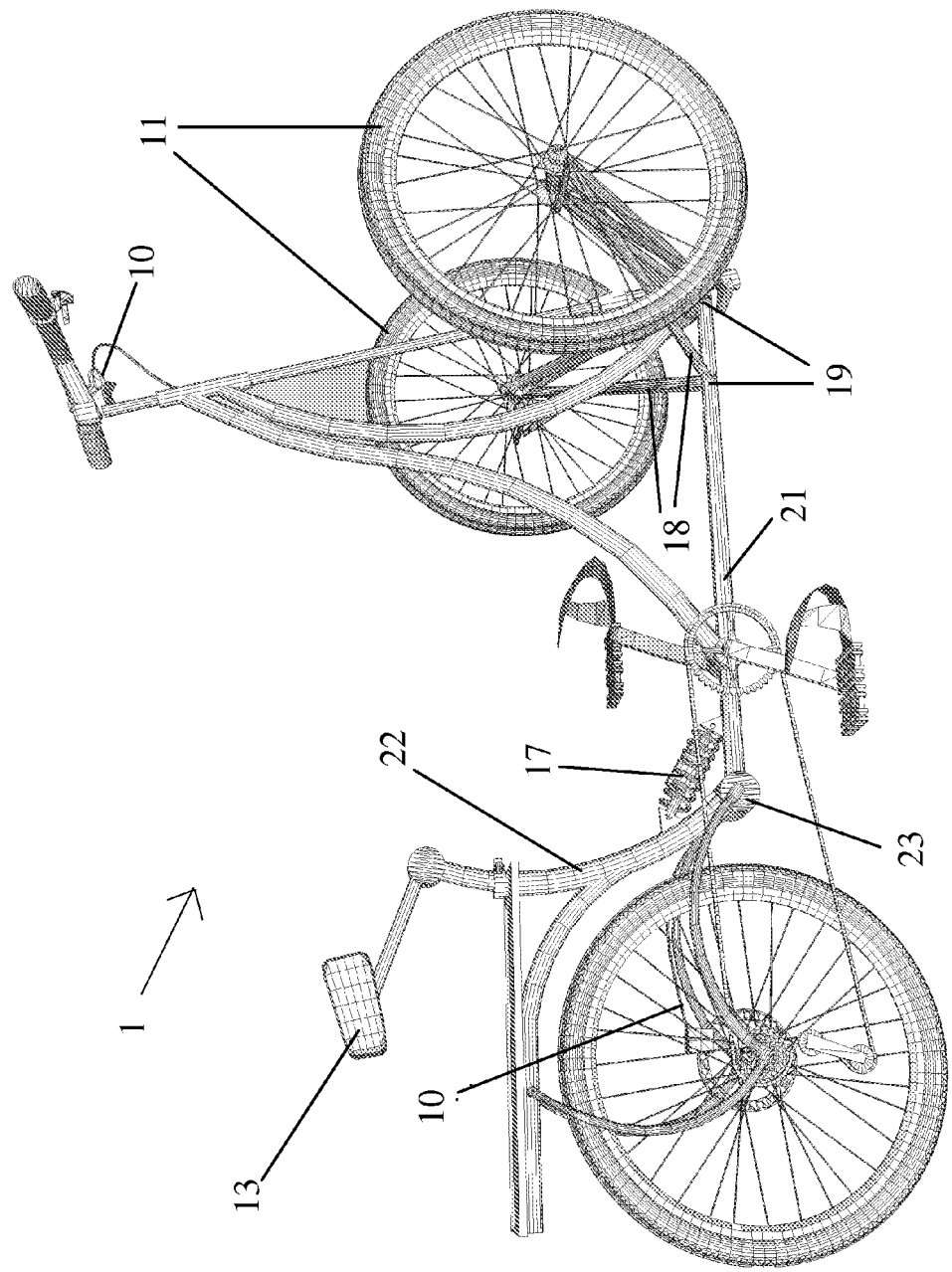
FIG. 2 is a perspective view of the ergonomic exercise tricycle of FIG. 1, in which the back support and front wheels are partially retracted, intermediate between its use configuration and its storage/transport configuration. This figure also highlights the shock absorbing mechanism of this tricycle which minimizes road vibrations that might otherwise reach the rider's spinal column.
Figure 3:
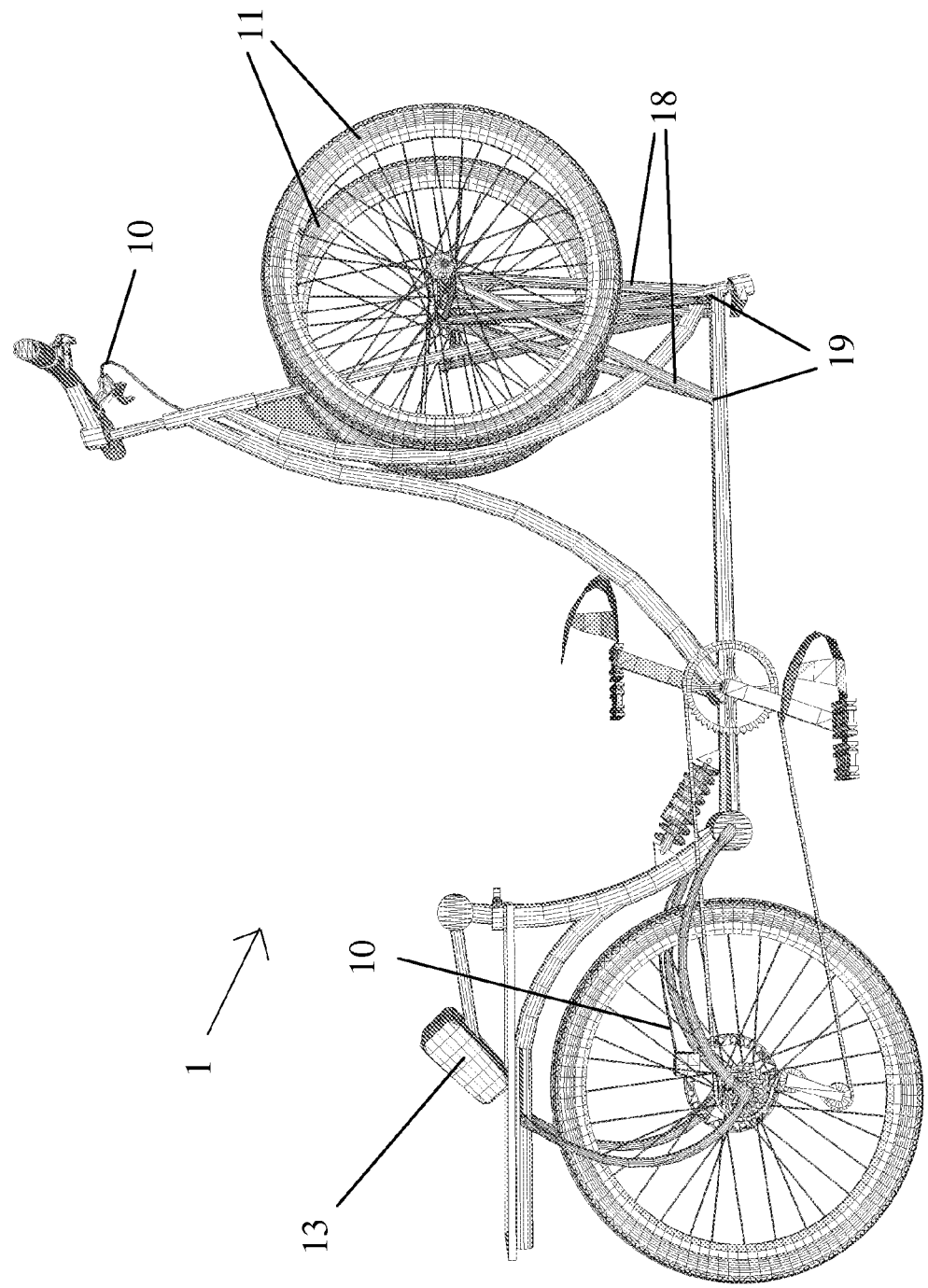
FIG. 3 is a perspective view of the ergonomic exercise tricycle of FIG. 1, in which the back support and front wheels are fully retracted into a configuration enabling the tricycle to be compactly stored and transported.

Finally, as shown in FIGS. 2 and 3 the ergonomic exercise tricycle front end folds inward for easy stowing on standard rear mounted bike racks or space saving storage in garage, and for easy transport.

Figure 1:
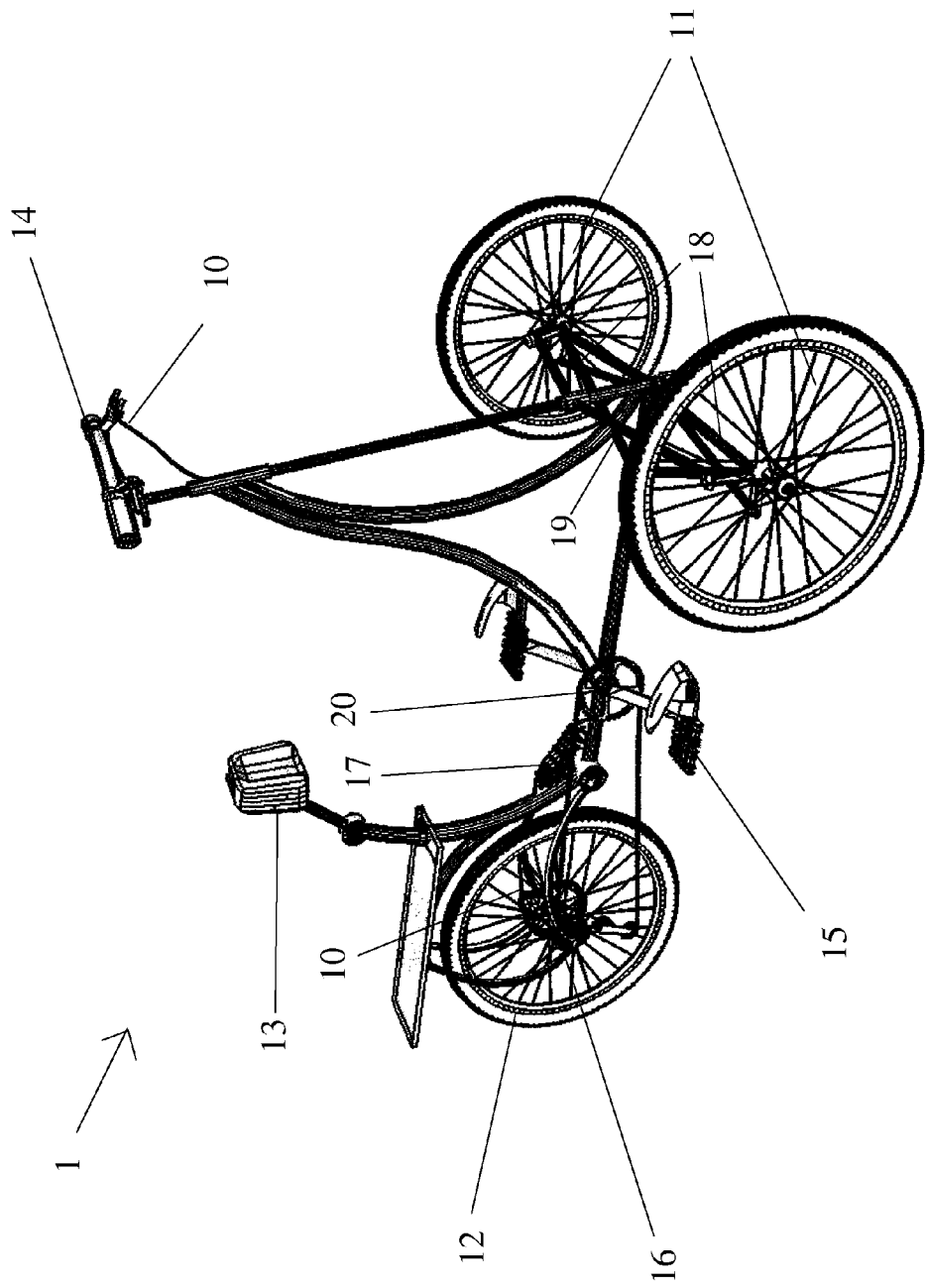
FIG. 1 is a perspective view of an ergonomic exercise tricycle in a preferred embodiment of the invention, ready to be used by a rider thereof.

FIG. 1 illustrates the ergonomic exercise tricycle 1 in a preferred embodiment of the invention. As already stated, tricycle 1 is fashioned around a two-front-wheel 11 configuration. These two front wheels 11 are attached to a mid-frame member (21 in FIG. 2) by front wheel a strut supports 18. A standard trike design, with two wheels in the rear, causes too much weight to be placed on the single front tire that is forced to handle the cornering forces resulting in tipping and/or turnovers. By providing two front wheels 11 and one rear wheel 12, this tricycle has increased stability and handling capabilities.

This stability, which includes a balanced center of gravity distributed roughly equally among all three wheels with approximately one-third of the total weight of the tricycle and the rider resting on each wheel and no more than 40% of the weight resting on any single wheel in an at-rest state, provides the foundation to enable the rider to maintain an upright posture atop this trike 1, whether in motion or at rest, and when in motion, whether turning or proceeding straight.

To further ensure a standing, upright posture throughout, importantly, this tricycle omits (does not comprise) any seat. Rather, a back support (check gauge) 13 is positioned relative to two front handles 14 (one for each hand of the rider) and two pedals 15 (one for each foot of the rider) such that when the rider's feet are atop the pedals 15 and the rider's hands are touching the handles 14, the rider is forced into a substantially upright, standing position and is deterred from leaning, crouching, or sitting. As illustrated in FIG. 1, these two pedals 15 are circularly rotatable about a central pivot point 20 in a manner customary for bicycles, such that the rider's feet rotating pedals 15 about the central pivot point 20 rotates the rear wheel 12 to move the tricycle forward. Both the back support 13 and the front handles 14 are configured to be raised and lowered, so that their heights can be adjusted to match the height of any particular rider. In general, the heights required for back support 13 and front handles 14 above pedals 15 to enforce the correct upright posture will vary depending on the height of the rider, and so are adjustable. Regardless of the user's height, the back support should be at a height and in a position so that it gently contacts the small of rider's back in the lumbar or lower thoracic region and induces the rider spinal column into an upright posture. Generally, when a user first configures the trike 1, he or she will make these adjustments, perhaps with the aid of a second person, to as to provide the correct upright posture that is most comfortable to the user and beneficial to the spinal column as understood in the pertinent medical arts, and then lock in those settings using devices and methods therefore which are well-established in the mechanical arts. The 14 handles are configured in a unitary, integrated handlebar as illustrated, so that the rider's hands remain relatively stationary to one another during riding. This is in contrast, for example, to the separate, relatively moving handles of the tricycle mentioned earlier which is reviewed at http://www.treehugger.com/bikes/street-strider-cross-country-skiing-on-stand-up-trike-video.html. Tricycle 1 is not steered by leaning, but rather by simply turning the handlebars 14 and thus the front wheels, in a traditional manner.

The pedals 15 are connected to the rear wheel 12 such that actuation of the pedals 15 by a rider rotates pedals 15 about the central pivot point 20 which in turn rotates the rear wheel 12 so as to move the tricycle 1 forward in the expected and conventional manner, using devices and methods well-established in the art. The drawings all illustrate a (unnumbered) gear and belt mechanism such as is conventionally use to impart motion to velocipedes via rider actuated pedals.

It is also highly preferred to provide an optional locking rear disc brake 16 for locking the rear wheel 12 into a stationary (non-rotating) state. This brake is also configured to be actuated by the rider while the rider is mounted on the tricycle. This allows the rider to mount the trike 1 and engage the pedals 13 while the brake 16 locked, then release the brake 16, and go. When the rider wishes to pause, and stay paused, the rider can then lock the brake 16 for example not limitation, by pressing on a brake lock 10 which comprises a hand lever actuating a brake lock cable running from a front handle 14 to the brake 16. Such locking brakes are "off-the-shelf" component elements known in the art, appearing, for example, in class 188, subclasses 28.18 and 265 of the US Patent Classification System. The beneficial result from configuring the trike 1 with the locking rear disc brake 16 is that there is no need during a pause to disengage the pedals 13 and dismount. When the rider wishes to continue, he or she simply unlocks the brake 16, starts to pedal again, and continues on. Because of the stable center of gravity, it is easy for the user to safely mount and dismount the trike 1. There is no need to generate any forward momentum before mounting the trike 1 as is required when mounting a regular bicycle. Nor is there any need to dismount the trike 1 before the momentum ceases to avoid falling as the gyroscopic action of the wheels diminishes when the wheels slow their rotations. Such moving dismount is required when dismounting a regular bicycle, and cannot be safely managed by some users with limited physical capacity or acumen or athleticism. Optionally, pedals 13 are oversized to provide better foot support. Also shown is a mid-frame shock suspension 17, which will be reviewed further in connection with FIG. 2.

Of course, when trike 1 is not in use, it is also desirable to be able to collapse/compact the trike 1 from the fully-deployed for riding configuration of FIG. 1, for storage and/or transport. FIGS. 2 and 3 illustrate how the back support 13 and front wheels 11 are collapsible/retractable for easy compact storage and transport.

In FIG. 2 we see the front wheels 11 partially retracted, wherein the front wheel axles 18 are rotated upwards about a pivot point or points 19 at which they meet the a mid-frame member 21, through a vertical plane normal to the front-to-back length of the trike 11. As can be seen, the struts 18 are configured such that as the struts 18 are rotated upwards, the front wheels 11 remain substantially parallel to one another in the same plane as when the trike 1 is in the fully-deployed configuration. At the same time, we see back support 13 partially rotated towards the rear of trike 1.

FIG. 2 further illustrates how the mid-frame shock suspension 17 provides a smoother ride, by introducing a spring tension between a mid-frame member 21 and rear frame member 22 about a frame pivot 23. It will be appreciated from viewing the drawings how this configuration will serve to absorb shocks that may otherwise occur due to uneven riding surfaces. By mitigating road shocks, this protects the rider's back and so enhances the ergonomic and chiropractic benefits of this tricycle.

In FIG. 3, the front wheels 11 are fully retracted. The struts 18 have been rotated upwards though a strut retraction angle which in a preferred embodiment is substantially equal to ninety degrees. Different embodiments may be designed with somewhat different strut retraction angles, so in general, this strut retraction angle will be from 75 degrees to 105 degrees. During retraction, however, the front wheels 11 and related axle assemblies still remain substantially parallel to one another in the same plane as when the trike 1 is in the fully-deployed configuration. Thus, in the retracted configuration of FIG. 3, the front wheels themselves are substantially parallel and adjacent to one another, but are elevated relative to the fully-deployed configuration and separated substantially only by the tricycle frame, as illustrated. It will be appreciated how this facilitates compact storage and easy transport, because in this configuration, trike 1 approximates the configuration of a two-wheeled bicycle, but with the front wheels in a raised position, all as illustrated. At the same time, we see back support 13 fully rotated toward the rear of trike 1.

To go from the retracted/compacted configuration of FIG. 3 to the fully-deployed configuration of FIG. 1, one simply unfolds the struts oppositely to what has just been described. Suitable locking mechanisms, such as will be apparent to someone of ordinary skill in the art, are used to safely and securely lock the struts and the wheel/axle assembly into place in the configuration of FIG. 1, so that the rider can use the trike 1 without worry that the trike might suddenly start to retract while it is in use.

The knowledge possessed by someone of ordinary skill in the art at the time of this disclosure, including but not limited to the prior art disclosed with this application, is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A mobile ergonomic exercise tricycle apparatus, comprising:
    two front wheels;
    one rear wheel of substantially a same diameter as said two front wheels;
    two front handles, one for each hand of a rider;
    two pedals circularly rotatable about a central pivot point, one for each foot of the rider;
    a connection between said pedals and said rear wheel such that actuation of said pedals by the rider's feet rotating said pedals about said central pivot point rotates said rear wheel to move said tricycle forward;
    a connection between said handles and said front wheels such that turning said handles simultaneously turns said front wheels to steer said apparatus and said tricycle is not steered by leaning; and
    a mid-frame shock suspension for providing a spring tension between a mid-frame member and a rear frame member of said apparatus, said mid-frame member connecting said two front wheels with said rear frame member and said rear frame member further having a connection to said rear wheel; wherein:
    said tricycle does not comprise any seat for sitting;
    said pedals are positioned relative to said front handles such that when the rider's feet are atop said pedals and the rider's hands are touching said front handles, the rider is forced into a substantially upright, standing position when said apparatus is at rest and in motion; and
    said spring tension absorbs and mitigates shocks from said apparatus riding over uneven surfaces.

2. The apparatus of claim 1, further comprising: a back support positioned relative to said front handles and said pedals such that the back support induces the lumbar or lower thoracic region of the rider's back to further maintain the rider's substantially upright, standing position, and to deter the rider from leaning, crouching, or sitting.

3. The apparatus of claim 2, further comprising:
    a brake for locking said rear wheel into a stationary state while the rider is standing on said pedals.

4. The apparatus of claim 2, wherein, to prepare said tricycle for storage or transport said back support is configured to be rotated toward a rear of said tricycle.

5. The apparatus of claim 1, further comprising:
    a brake for locking said rear wheel into a stationary state while the rider is standing on said pedals.

6. The apparatus of claim 1, wherein, to prepare said tricycle for storage or transport:
    said two front wheels and related axle assemblies and their attachment via struts to a frame of said tricycle are configured such that said two front wheels are adapted to transform from a fully-deployed configuration thereof into a position wherein they remain substantially parallel and adjacent to one another, but are elevated relative to said fully-deployed configuration and separated substantially only by the tricycle frame.

7. A method of exercising using the apparatus of claim 1, comprising the steps of:
    a rider holding said tricycle at rest;
    while said tricycle is at rest, placing the rider's hands upon two front handles of said tricycle, one handle for each hand of the rider;
    while said tricycle is at rest, placing the rider's feet upon two pedals of said tricycle, circularly rotatable about a central pivot point, one pedal for each foot of the rider;
    said tricycle remaining balanced while at rest with the rider's hands upon the handles and the rider's feet upon the pedals by virtue of said tricycle comprising two front wheels and one rear wheel of substantially a same diameter as said two front wheels;

the rider being forced into a substantially upright, standing position when the rider's feet are atop said pedals and the rider's hands are touching said front handles by virtue of how said pedals are positioned relative to said front handles;

the rider moving said tricycle forward by the rider's feet rotating said pedals about said central pivot point to actuate said pedals to rotate said rear wheel via a connection between said pedals and said rear wheel, while maintaining said substantially upright, standing position; and steering said tricycle by turning said front wheels by turning said handles, not by the rider leaning.

8. The method of claim 7, further comprising the step of:

the rider further maintaining said substantially upright, standing position, via a back support positioned relative to said front handles and said pedals such that the back support induces the lumbar or lower thoracic region of the rider's back to deter the rider from leaning, crouching, or sitting.

9. The method of claim 8, further comprising the step of:

the rider stopping the tricycle or keeping the tricycle at rest, while the rider is standing on said pedals, by applying a force to a hand brake for locking said rear wheel into a stationary state.

10. The method of claim 8, further comprising the step of:

preparing said tricycle for storage or transport by rotating said back support toward a rear of said tricycle.

11. The method of claim 7, further comprising the step of:

the rider stopping the tricycle or keeping the tricycle at rest, while the rider is standing on said pedals, by applying a force to a hand brake for locking said rear wheel into a stationary state.

* * * * *